UNITED STATES PATENT OFFICE.

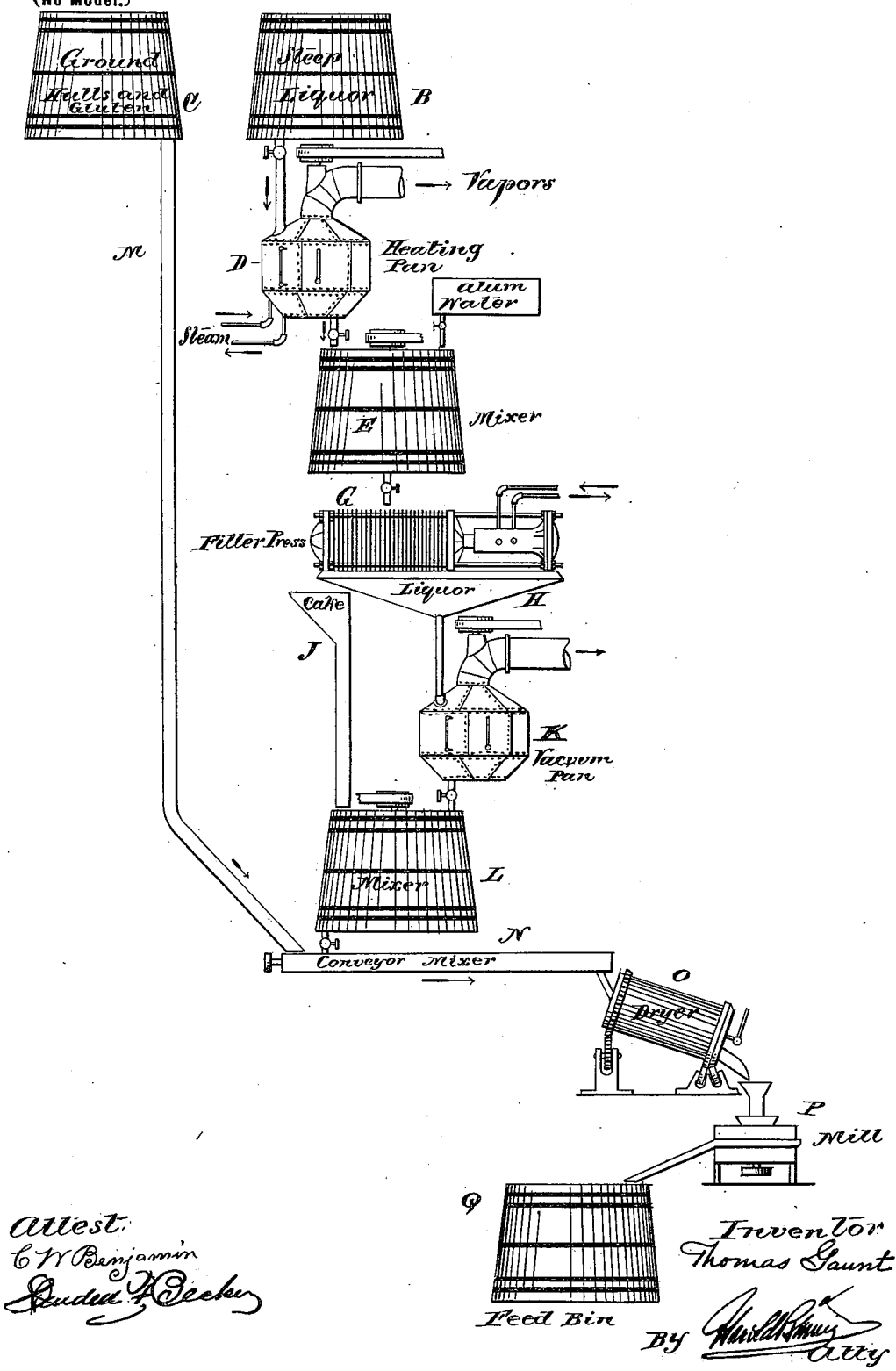

THOMAS GAUNT, OF PEORIA, ILLINOIS, ASSIGNOR OF TWO-THIRDS TO WILLIAM HAMLIN AND HARRY HAMLIN, OF BUFFALO, NEW YORK.

PROCESS OF MANUFACTURING CATTLE-FEED.

SPECIFICATION forming part of Letters Patent No. 664,262, dated December 18, 1900.

Application filed September 29, 1897. Renewed July 14, 1900. Serial No. 23,677. (No specimens.)

*To all whom it may concern:*

Be it known that I, THOMAS GAUNT, of Peoria, Illinois, have invented certain new and useful Improvements in Cattle-Feed and Processes of Manufacturing the Same, of which the following is a full, clear, and exact description.

My invention relates particularly to cattle-feed made from corn, though it will be seen that it is applicable to other cereals.

My new cattle-feed consists of a combination of the finely-ground hulls obtained when the starch has been separated from the hulls by well-known processes with the gluten which flows from the end of the starch-tables, with the carbohydrates and albuminoids which are extracted by steeping the corn and have heretofore been usually thrown away, and with alum or its equivalent.

As will be well understood by those skilled in the art, after the hulls have been steeped for a long time, preferably in hot sulfurous-acid solution, the hulls are broken, the germs are disintegrated from the hulls and separately collected, and the starch is separated from the hulls and germs by various forms of treatment, which need not be enumerated.

It is not even essential in the broader aspect of the present invention that the germs should be separated, though it is distinctly preferable.

The starch liquor or milk is in wet processes usually run upon starch-tables, where the starch deposits, while much of the gluten of the corn flows from the end of the starch-tables and may be recovered by settling and afterward drying.

The novel features of the present invention lie in the treatment of the steep liquor, which contains much of the carbohydrates and albuminoids and other valuable substances; also, in the recovery of these substances and their admixture with the ground hulls; also, in the improved cattle-feed which I produce.

I will first point out by means of the accompanying diagram the process in the form which at present I prefer.

It must not be understood that the accompanying diagram is intended to illustrate the details of the apparatus nor even to illustrate generally all the apparatus employed. On the contrary, it is intended as a mere illustrative diagram of the successive principal steps of the process without regard to duplication and repetition, which are frequently necessary, as will be well understood, to obtain the best results at each step.

Let it be assumed that the steep-water in which the corn has been steeped is collected in a tank B and that the ground hulls are collected in the tank C. The steep liquor may be heated up to the boiling-point in a heating-pan D, or in a modification of my process it may be boiled therein and partially concentrated. I prefer merely to heat it to the boiling-point. Leaving the pan D, the hot liquor may be run into mixing-tank E, into which a relatively small quantity of alum solution may be introduced from a supply-tank F. The amount of alum to be added varies somewhat with the quantity of the corn and the length of time during which it has been steeped, so that it is advisable in order to get the very best results to ascertain the amount of solid substance in the steep liquor and proportion the alum thereto. The operator may be guided by the consideration that one part, by weight, of powdered alum will cause precipitation in steep liquor containing one hundred times as much solid substance; but to get the very best results it is well to test the steep liquor in each case by introducing some into a test-tube and adding a drop or two of alum solution of a known density. After adding the alum-water in a tank E the precipitate may be removed from the filtrate by means of a filter-press G or in any desired manner. The filtered liquor may be collected in the hopper H, and the filter-cakes formed by the precipitate may be conveniently passed down the chute J into a mixing-tank L. The liquor collected in the hopper H is now ready for concentration, being freed to a large extent of the albuminous substance. It may be run into the vacuum-pan K and there concentrated to a density of 30° Baumé. The density to which it can be conveniently concentrated in the vacuum-pan will depend largely on the amount of albuminous substances which have been precipitated by the alum and will consequently depend largely on the amount of alum introduced. After concentration in the pan K the concentrated liquor is run into the mixer L and mixed with the broken filter-cake received from the chute J. In the mixer L there are therefore contained all the solid substances which were in solution in the steep liquor in the tank B, and these substances are obtained in a concentrated mixture with water and alum. They are now ready to be added to the ground hulls and gluten from the tank C. The ground hulls and gluten may be led through the chute M to the conveyer N, and the substance from the steep liquor may be carried from the tank L into the same conveyer N, so that by means of the conveyer they are thoroughly stirred into the hulls, forming the moist or wet mass of feed. From the conveyer N this wet feed may be carried to a steam-heated drier O and subjected to dry heat. From the drier O the feed may be pressed through the mill P to the storage-bin Q ready for shipment.

It will be seen that the finished feed consists of an admixture of the solid contents of the steep-water with alum, ground hulls, and gluten and germs, if these substances are added.

Having in the foregoing fully set forth my invention, I claim, and desire to secure by these Letters Patent, the following:

1. The improved process of producing cattle-food, which consists in adding alum to the steep liquor obtained by steeping the cereal in aqueous solution or water, filtering the resultant mixture, concentrating the filtrate, and thereafter commingling the filtrate and the precipitate from the filter with the ground hulls or husks and drying the resultant mixture, substantially as set forth.

2. The improved process of producing cattle-food, which consists in heating, and adding alum to, the steep liquor obtained by steeping the cereal in aqueous solution or water, filtering the resultant mixture, concentrating the filtrate, and thereafter commingling the filtrate and the precipitate from the filter with ground hulls or husks and drying the resultant mixture, substantially as set forth.

In testimony whereof I have hereunto set my hand this 22d day of July, 1897.

THOMAS GAUNT.

Witnesses:
CARRIE M. GILL,
EUNICE R. KELLOGG.